(12) United States Patent
Gibson et al.

(10) Patent No.: US 6,721,723 B1
(45) Date of Patent: Apr. 13, 2004

(54) STREAMING METATREE DATA STRUCTURE FOR INDEXING INFORMATION IN A DATA BASE

(75) Inventors: Seann A. Gibson, Columbus, OH (US); William K. Gibson, Columbus, OH (US)

(73) Assignee: 1st Desk Systems, Inc., Medway, MA (US)

( * ) Notice: Subject to any disclaimer, the term of this patent is extended or adjusted under 35 U.S.C. 154(b) by 0 days.

(21) Appl. No.: 09/471,574

(22) Filed: Dec. 23, 1999

(51) Int. Cl.$^7$ .......................... G06F 17/30; G06F 17/00
(52) U.S. Cl. .................. 707/2; 707/3; 707/100
(58) Field of Search .................. 707/100, 101, 707/102, 104.1, 2, 3

(56) References Cited

U.S. PATENT DOCUMENTS

| | | | | |
|---|---|---|---|---|
| 4,868,743 A | * | 9/1989 | Nishio | 707/3 |
| 5,283,894 A | * | 2/1994 | Deran | 707/1 |
| 5,623,541 A | * | 4/1997 | Boyle et al. | 379/136 |
| 5,684,976 A | * | 11/1997 | Soheili-Arasi et al. | 711/128 |
| 5,737,732 A | * | 4/1998 | Gibson et al. | 707/2 |
| 6,055,515 A | * | 4/2000 | Consentino et al. | 705/27 |
| 6,067,574 A | * | 5/2000 | Tzeng | 709/247 |
| 6,081,624 A | * | 6/2000 | Krishnaswamy | 382/240 |
| 6,169,983 B1 | * | 1/2001 | Chaudhuri et al. | 707/2 |
| 6,311,221 B1 | * | 10/2001 | Raz et al. | 709/231 |

OTHER PUBLICATIONS

Choi et al "T*–tree: a main memory database index structure for real time application", IEEE 1996, pp. 81–88.*

* cited by examiner

Primary Examiner—Uyen Le
(74) Attorney, Agent, or Firm—Altman & Martin

(57) ABSTRACT

A streaming metatree data storage structure in which each data item is stored as a procession of nodes and where data units common to more than one data item are stored only once. The nodes are stored in a logically linear fashion, or stream, and information within a node indicates its relationship to the other nodes and with the tree hierarchy. The data structure provides a mechanism for distributing the nodes among multiple physical memory blocks and for traversing backwards through the tree. Data items are added by creating a temporary tree for new items until it becomes too large, and then merging the temporary tree into the main tree.

14 Claims, 10 Drawing Sheets

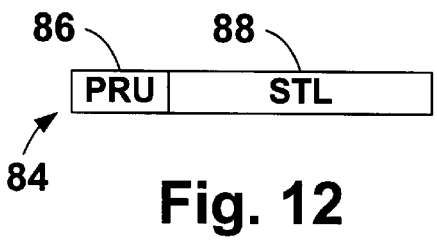
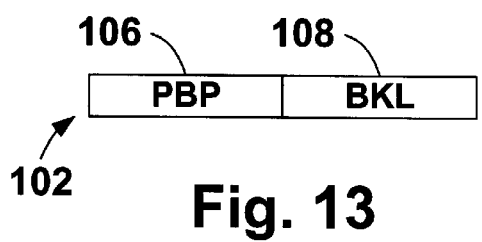
Fig. 12　　　　　Fig. 13
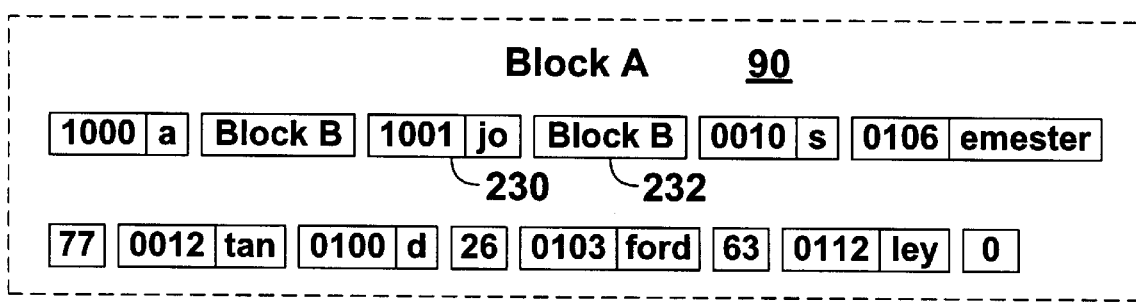
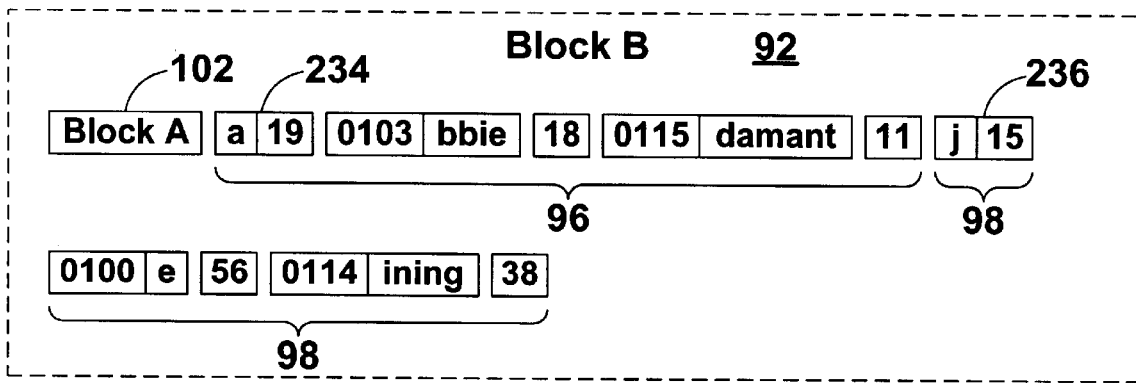
Fig. 14

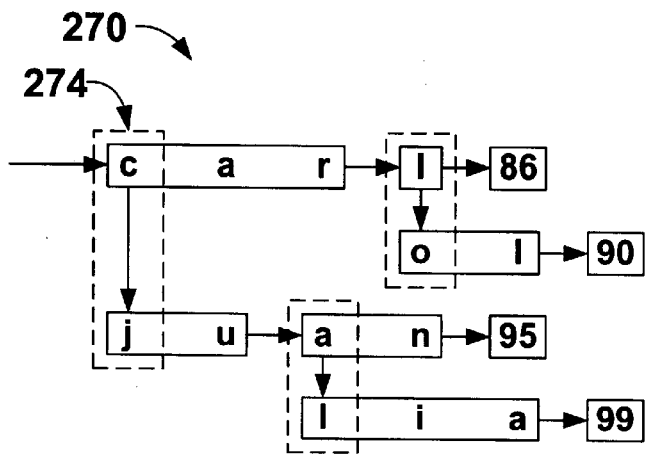
Fig. 17
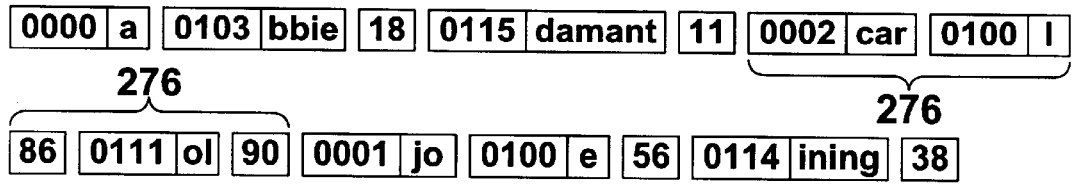
Fig. 18
Fig. 19

STREAMING METATREE DATA STRUCTURE FOR INDEXING INFORMATION IN A DATA BASE

CROSS-REFERENCES TO RELATED APPLICATIONS

Not Applicable

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPACT DISK APPENDIX

Two copies of a single compact disk, labeled Computer Program Listing Appendix Copy 1 and Computer Program Listing Appendix Copy 2, are incorporated herein. Each compact disk contains the following six text files: AddDataItem.txt, BackwardTraverse.txt, DataStructures.txt, ForwardTraverse.txt, MergeTrees.txt, and Remove-Datatem.txt.

BACKGROUND OF THE INVENTION

1. Field of the Invention

The present invention relates to storing information and, more particularly, to a tree configuration by which an indexing data base is stored in streaming memory and accessed.

2. The Prior Art

In many computer applications, large amounts of information must be stored and accessed. Generally, during the process of deciding how this information is to be stored, a tradeoff must be made between time and memory. The time variable includes the amount of time necessary to store information, to locate a particular piece of information, and to recreate the information once located. The memory variable includes the amount of memory necessary to store the information and to store and execute the software necessary to store, locate, and recreate the information.

There are actually two time/memory issues related to storing information, the first issue being how the information itself is stored in an information data base and the second issue being how a particular item of information is found within the information data base. The simplest way to store information is linearly, that is, information is stored in data memory as it is received and is not modified or compressed in any way. In such a system, a given amount of information occupies a proportional amount of data memory. The main advantage of such a system is that the amount of time needed store the information is minimized. The main disadvantage is that data memory requirements and the time needed to retrieve the information grow in direct proportion to the amount of information stored.

The simplest way to find a particular item of information is to linearly search the entire information data base for the item until it is found. This method is advantageous in that it is simple to implement, but the amount of time needed to find particular information is unpredictable in the extreme and the average time to find a particular piece of information can be unduly great.

An alternate method for finding information is to use a keyword data base, also called an index. The index is stored in memory separate from the information data base. Each keyword of the index includes a set of pointers that points to one or more locations in the information data base that correspond to that keyword. Thus, rather than searching a large information data base for particular items of data, an index is searched for keywords, typically greatly reducing the search time.

The simplest index structure is an alphabetic list of the data items, with each item followed by the appropriate pointers. The disadvantage of such a structure is that, in order to find any particular data item, the list must be searched from the beginning, leading to a potentially long search time. There are ways of decreasing the search time, such as by fixing the size of each index entry or by creating another list of pointers to each item in the index. Each increases the amount of memory needed, requiring a time/memory tradeoff.

An alternate structure for decreasing search time of an index data base is a tree structure, which consists of a group of related nodes, each node containing a subset of the stored data items, where the relationship between the nodes defines the data items. Each unique data item is stored as a set of linked nodes. In one tree structure, such as that described in U.S. Pat. Nos. 5,488,717 and 5,737,732, common parts of data items are combined into single nodes, followed by nodes containing the unique parts of the data items. The node containing the first part of the data item is called the root node and is generally common to more than one data item. The node containing the last part of the item is called the leaf node and is unique for each data item. The data base is searched from the root node for a known data item. When the search reaches the leaf node for that data item, a pointer or other identifier in the leaf node is used to locate the data item in the information data base.

The memory in which the index data base is stored has two forms, primary storage and secondary storage. Primary storage is typically the local random-access memory, or RAM. Secondary storage is typically a disk drive or other mass storage device. The significant differences between the two are that primary storage is much smaller and much faster than secondary storage. For example, current personal computers typically have 64 Mbytes of RAM and 10 Gbytes of disk storage space, a factor of 200 difference. Further, the time it takes to access the RAM is, on average, more than 100,000 times faster than to access the disk.

The typical index data base that is so large that linear storage is out of the question is also far too large to fit completely into primary storage. Consequently, most of the data base resides on disk, which means that the vast majority of search time is taken up by reading data from disk, not by the processing time needed to find the object of the search.

Additionally, most tree structures require that new data items be added individually, which means that the vast majority of inversion time, the process of adding data to a tree, is taken up by writing the updated tree to disk following each data item inversion. Typically, a trade-off must be made between inversion time and search time. When selecting a tree structure of the prior art, one must decide whether inversion time or search time is to be minimized because none of the tree structures of the prior art provide both fast inversion time and fast search time.

Thus, there continues to be a need for a data structure for indexes that provides for heavy concentration of data, rapid and predictable information location times, rapid inversion times, and that is easily adapted to the physical structure of secondary storage media.

SUMMARY OF THE INVENTION

An object of the present invention is to provide a data base structure that reduces secondary storage accesses during both the process of adding data items and searching for data items.

Another object is to provide a data base structure that minimizes secondary storage accesses while maximizing storage usage.

The essence of the streaming metatree (SMTree) of the present invention is its data storage structure. A typical prior art data structure uses randomly located nodes that point to the next succeeding node of the data item. Thus, nodes are followed by pointers to find a particular data item, jumping randomly between primary and secondary storage. On the other hand, the SMTree structure of the present invention stores nodes in a logically linear fashion, hence the term "streaming". Pointers are used in the present invention, although not in the same way as in the data structures of the prior art. Physical computer memory is composed of fixed-size blocks, throughout which the SMTree is distributed. Since the blocks can be randomly located in a physical sense, pointers are required. However, the data structure is such that a memory block will only be traversed at most one time during a search. Information stored within the node indicates its relationship to the other nodes and within the tree hierarchy. The SMTree structure is particularly suited for indexing-type structures.

There are two basic embodiments of the SMTree, a "horizontal" embodiment and a "vertical" embodiment, and a hybrid embodiment that uses components of both. The horizontal embodiment is most preferred because it is more efficient for the vast majority of applications.

Logically, the SMTree is composed of lists of alternative nodes. The root alternate list is a list of all data units that begin data items in the SMTree. When searching for a data item in the SMTree, the appropriate data unit from the root alternate tree is found and followed to the next lower level alternate list. This continues until the leaf node for the data item being search is reached. Following the leaf node is at least one identifier that references external objects.

Note that every data unit is considered to be part of an alternate list, and that many data units are in alternate lists that have only one member. In such a case, groups of single member alternate lists are combined into single nodes. For example, if the SMTree contains the two data items, "abbie" and "adamant", the lower level alternate list from the root alternate list member 'a' will have as members 'b' and 'd'. Logically, there will be three single member alternate lists following 'b', the first containing the member 'b', the second 'i', and the third 'e'. In order to save memory and processing time, the single member lists are combined into a node with the last member of an alternate list of more than one member. In this example, the nodes "bbie" and "damant" are the two members of the alternate list following 'a'.

In the horizontal embodiment, the nodes and identifiers are stored linearly and sequentially in memory, from the first member of the root alternate list to the leaf node of the last data item, where the first physical sequence of nodes define the first data item of the SMTree. In order to determine where the nodes fit in the SMTree, each node has a header. The header includes (1) the size of the node so that it is known how many memory locations to skip if the node is not needed, (2) a flag indicating whether or not the node is a leaf node so it is known that the search is at an end, (3) a flag indicating whether or not the node is the last node of an alternate list, and (4) a flag indicating the presence of a memory block pointer. If the memory block pointer flag is set, the node is followed by a memory block pointer. The present invention includes a mechanism for dividing the SMTree into subtrees to fit into multiple memory blocks. This mechanism includes the memory block pointer flag, the memory block pointer, and a subtree header that includes a previous data unit value. When a memory block is jumped to, it must be determined which subtree in the block is the next to be traversed during the search. The previous data unit value contains the first data unit of the alternate list member node from which the jump took place. After the jump, these previous units are compared to determine the appropriate subtree to continue with. Implicit within this mechanism is that all subtrees in a block must be pointed to from members of the same alternate list, because this is the only way that the all of the previous units in a memory block can be guaranteed to be unique. On the positive side, it also guarantees that a block will only be traversed once during a search.

The present invention also provides two mechanisms for traversing backwards through the SMTree. In the first, each block has a head that includes a pointer to the higher-level block that contains the alternate list with pointers to the subtrees in the lower-level block. The subtree previous unit is used to determine which alternate list member points to the lower-level block. In the second method, each forwardly traversed block is pushed onto a stack, and are popped from the stack when traversing backwards.

The SMTree is traversed using the node header information. The search begins with finding the first unit of the data item to be search in the root alternate list. Nodes are skipped, using the node size value, to reach each member of the root alternate list until the matching member is found. The node in the stream following the matched node is the first node of the next lower-level alternate list. The same procedure is followed with this alternate list as with the root alternate list. If a matching node is a leaf node, but the searched-for data item is not yet found, then the searched-for data item is not in the data base. After the searched-for data item is found, the identifier(s) that follow the leaf node are used as necessary.

Two mechanisms are contemplated for inversion, the process of adding data items to an SMTree. In the first, each new data item is added directly to the main SMTree. In the second, new data items are added a temporary SMTree until the temporary SMTree becomes too large, and then the temporary SMTree is merged with the main SMTree. Merging two SMTrees is a matter of merging the root alternate lists of the two SMTrees.

In the trees of the prior art, data items are added individually directly to the main tree, necessitating secondary storage accesses for each new data item. Since the SMTree of the present invention stores new data items in a temporary SMTree in fast primary storage before merging with the main SMTree in slower secondary storage, substantial savings in inversion time is realized. And the savings is accomplished without a corresponding increase in search time. The structure of the SMTree provides additional savings in inversion time by being particularly suited to being operated on by multiple processors. The alternate lists of the two SMTrees to be merged are divided between the processors at a point in the alternate list where the secondary storage between the two parts of the alternate list does not overlap. Since these different parts of an alternate list are completely independent of each other, the processors can operate completely independently.

The basic mechanism consists of traversing the SMTree searching for the new data item until a data unit of the existing data item differs from the new data item. Then a new node containing the different unit and all subsequent units is added to the alternate list following the last common unit. The mechanism is actually much more complex due to the fact that the SMTree is spread among numerous memory blocks, so that the size of the subtrees must be taken into account. If a subtree becomes too large for the memory block, it must be split into two subtrees or moved to another memory block.

A data item is removed by searching for the leaf node of the data item to be removed, and removing nodes in reverse order up to and including the node of a multiple-unit alternate list. Optionally, any resulting single member alternate list can be compacted.

In summary, the present invention is a data structure adapted for use with a computer for storing data items in a data base, where each of the data items is composed of at least one data segment and each data segment is composed of at least one data unit including a first data unit. The data structure of the present invention comprises (a) a linear stream of nodes, each of the nodes containing a data segment, the nodes including predecessor nodes and successor nodes and being related by location in the stream; (b) progressions of nodes in the stream from a root alternate list node to a leaf node corresponding to progressions of data segments of the data items; (c) the progressions being traversed from node information included in each of the nodes, the node information including a size value indicating the number of data units in the node, a leaf node flag indicating if the node is a leaf node, and a terminal alternate flag indicating if the node is an alternate list terminal node; (d) each of the progressions being associated with at least one identifier that references at least one object external to the stream; (e) selected data segments of different data items in selected progressions of successor nodes being different for different data items; and (f) selected data segments of different data items in selected predecessor nodes being common to said different data items.

Other objects of the present invention will become apparent in light of the following drawings and detailed description of the invention.

BRIEF DESCRIPTION OF THE DRAWINGS

For a fuller understanding of the nature and object of the present invention, reference is made to the accompanying drawings, wherein:

FIG. 12 is a diagram of a subtree header;

FIG. 13 is a diagram of a block header;

FIG. 14 is a diagram of how the SMTree of FIG. 11 is stored in memory;

FIG. 17 is a diagram of an SMTree to be merged into the SMTree of FIG. 5;

FIG. 18 and 19 are diagrams showing how the SMTree of FIG. 17 is merged into the SMTree of FIG. 5;

DETAILED DESCRIPTION

As an initial matter, this description of the present invention refers to a complete unique part of the information being stored as a data item, to a portion of the data item as a data segment, and to the smallest possible portion of a data item as a unit. In the typical information data base, the data will take the form of strings of characters, so that a data item is a string such as a sentence, a data segment is a substring (which can also be as large as the complete string or as small as a single character), and a data unit is a character. It is to be understood, however, that strings of characters are merely illustrative of a broad range of other data formats, such as binary numbers, single bits, and combinations of data formats. An example of the latter includes a word index for a text file where the first part of a data item is a word being indexed and the second part of the data item is a binary pointer to the location of the word in the text file.

Index Trees

Figure 1:
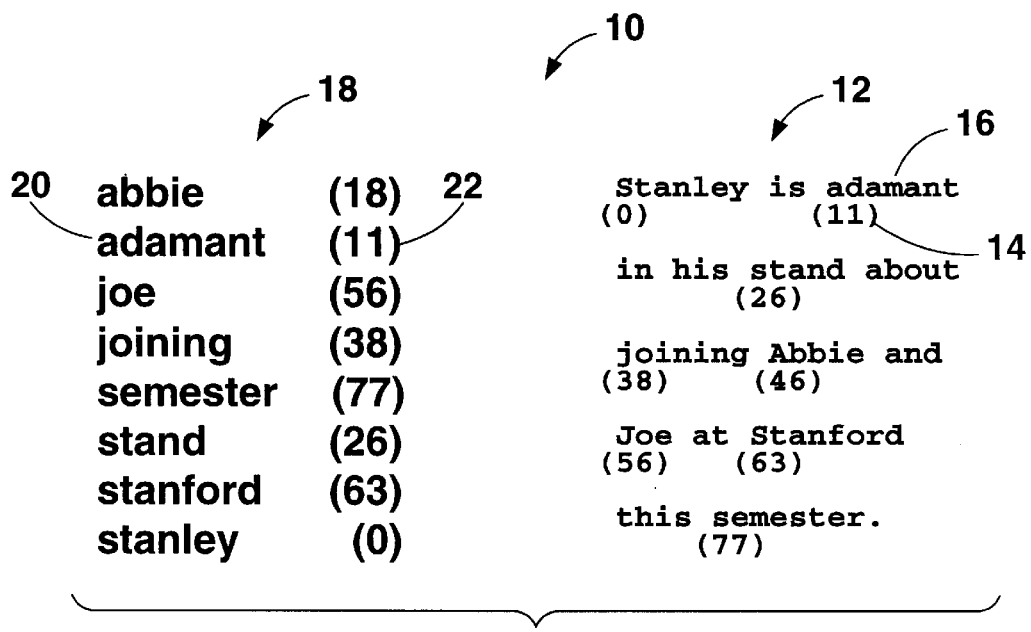
FIG. 1 shows a simple data base and corresponding index.

Data is stored in data bases, of which there are a variety of organizations. The data base structure of the present invention is most suited to the index of an information data base. In an information data base/index combination organization 10, shown in FIG. 1, each unique data item 14 in the information data base 12 typically has a unique identifier 16 associated with it. This unique identifier 16 may be, for example, the location of the data item 14 within the information data base 12. Each keyword 20 in the index 18 contains one or more identifiers 22, where each identifier 22 corresponds to an identifier 16 in the information data base 12. To find particular data items 14 of information, the index 18 is searched for keywords 20 and the associated identifiers 22 are used to locate the data items 14 in the information data base 12.

Figure 2:
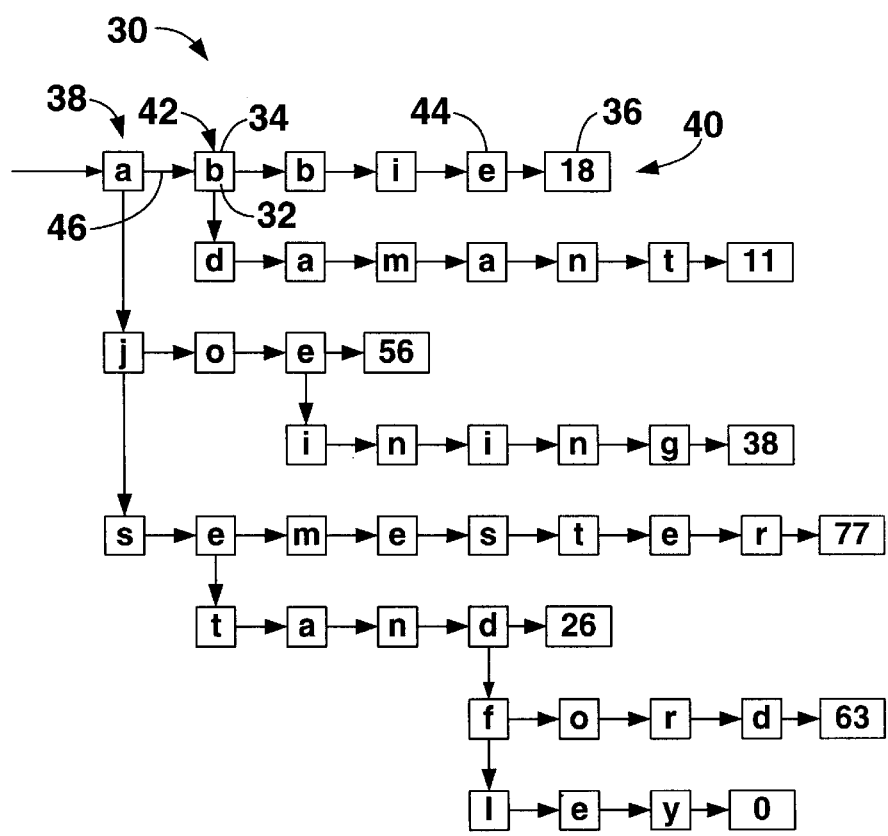
FIG. 2 is a prior art tree structure for the index of FIG. 1.

Data in a tree structure is stored so that successive duplicate segments are not duplicated in memory. For example, a typical prior art tree 30 containing the eight data items of FIG. 1, abbie, adamant, joe, joining, semester, stand, stanford, and stanley, is shown in FIG. 2. In this structure, each unit 32 is a character that is stored in a separate node 34. At the end of each data item is an additional node 36 holding the identifier 22 that associates the data item with the information data base.

When traversing the tree 30, a searcher first looks for a unit match in the left-most vertical group 38, denoted as an alternate list (the left-most alternate list is called the root alternate list), and follows the horizontal group 40 of the matched unit, as at 46. When the searcher encounters another alternate list 42, it again looks for a unit match and follows the corresponding horizontal group. This progression continues until the last node 44 of the data item is reached. The node 36 after the last node 44 of the data item contains the identifier 22 that points into the information data base.

Computer Configuration

Figure 3:
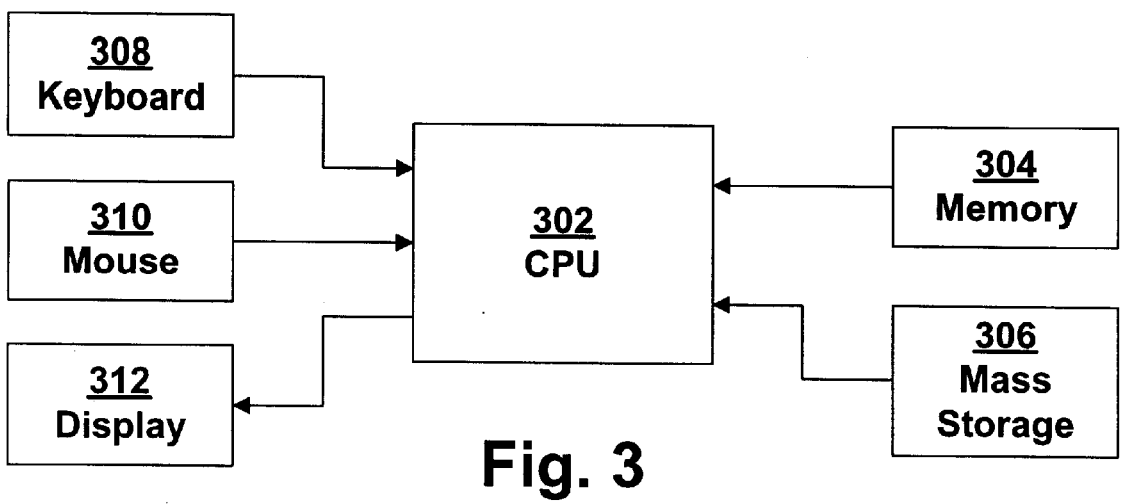
FIG. 3 is a block diagram of the hardware of a digital data processing system.
Figure 4:
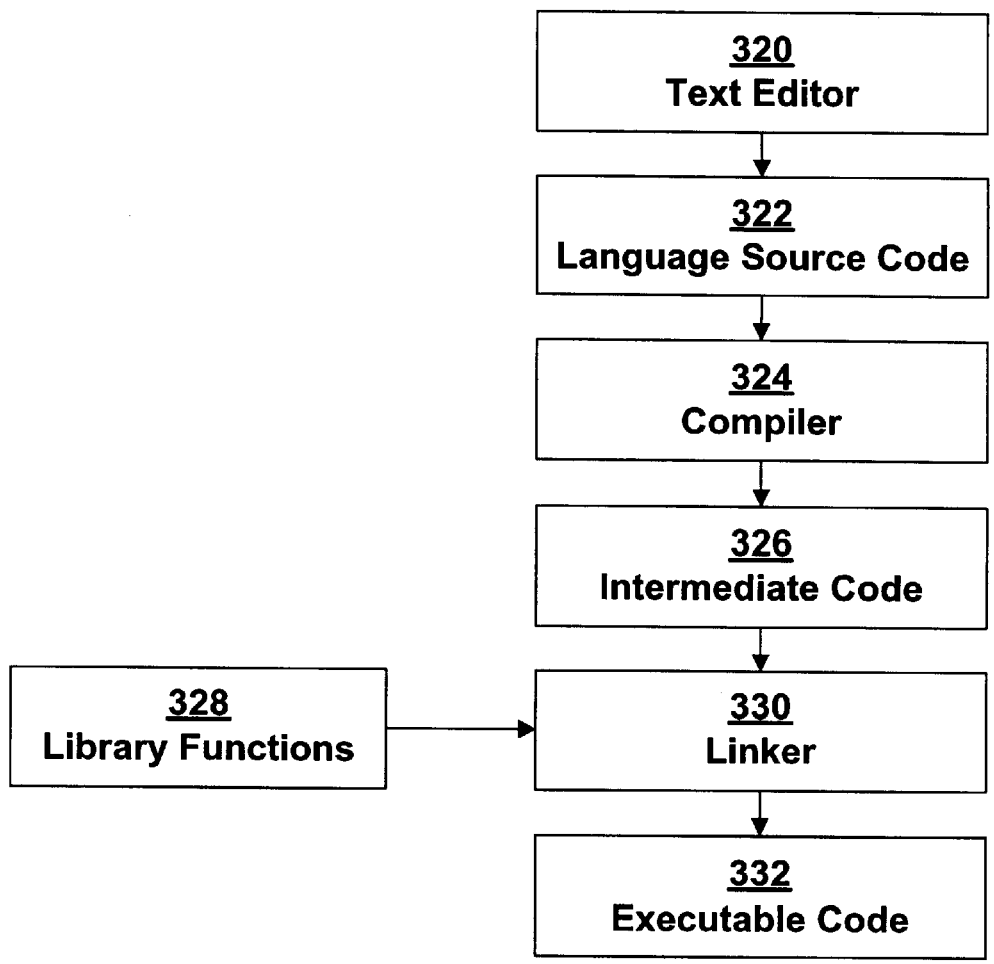
FIG. 4 is a block diagram of the software of a digital data processing system.

The graphic illustrations and pseudocode described below are implemented in a digital computation system as shown in FIG. 3. This system comprises an architecture including a central processing unit (CPU) 302, primary storage (local memory) 304, secondary storage (mass storage) 306, and input/output devices, including a keyboard 308, a mouse 310, and a display 312. Residing within the primary storage 304 as CPU-executable code is the operating system and user applications, as in FIG. 4. In the illustrated system, executable code 332 is generated from two inputs. The first input is the source code 322 written in the language chosen by the programmer and generated using a text editor 320. The source code 322 is processed by a compiler 324 into an intermediate code 326. The second input is a library of standard functions 328 that has previously been compiled. The intermediate code 326 and the library functions 328 are processed together by a linker 330 into machine-readable code 332, executable by the CPU 302, and stored in primary storage 304.

It is to be understood that the principles of the present invention are applicable to all digital computation systems. For example, the type of CPU 302 is not limited to a particular family of microprocessors, but can be chosen from any group of suitable processors. This is also true of the primary storage 304, secondary storage 306, and input/output devices 308, 310, 312. Likewise, the programmer may choose from a variety of programming languages, such as C, Pascal, BASIC, and FORTRAN, the appropriate compiler, linker, and libraries.

Streaming Metatree

The essence of the streaming metatree (SMTree) is its data storage structure, which is different from any other previously implemented data storage structure. The typical tree structure is based on a node structure where each node has a pointer to the next succeeding node and the nodes are stored in random locations in memory. Thus, finding a particular data item is a matter of traversing the tree by following pointers to random memory locations, possibly jumping between primary storage and many different locations in secondary storage. On the other hand, the SMTree structure of the present invention is based on storing nodes in a logical order in memory, so that traversing through the SMTree is a matter of reading through memory in a linear fashion, hence the term "streaming". This is not to say that pointers are not used in the present invention. As described in detail below, the SMTree is not physically a single stream of nodes. Physical computer memory, particularly secondary storage, is composed of fixed-size blocks. By necessity, the SMTree is distributed among these memory blocks, and since the blocks can be randomly located in a physical sense, pointers are required. However, nodes are stored in the memory blocks so that they are logically linear, that is, a memory block will be traversed only once, if at all, while searching for or retrieving a data item. Information stored within each node indicates the node's relationship to predecessor nodes and successor nodes in the stream, and its location in the hierarchy of the tree. The SMTree structure is used easily in information storage and retrieval applications, particularly for indexing-type structures.

There are two basic embodiments of the SMTree of the present invention, a "horizontal" embodiment and a "vertical" embodiment, where horizontal and vertical are referenced to the physical layout of FIG. 2. There is also a hybrid embodiment that uses components of both the horizontal and vertical embodiments.

At the end of each section of the horizontal embodiment, pseudocode implementing the subject discussed in the section is listed. Later pseudocode builds on the earlier pseudocode.

Horizontal Embodiment

1. Structure of the Horizontal Embodiment

Figure 5:
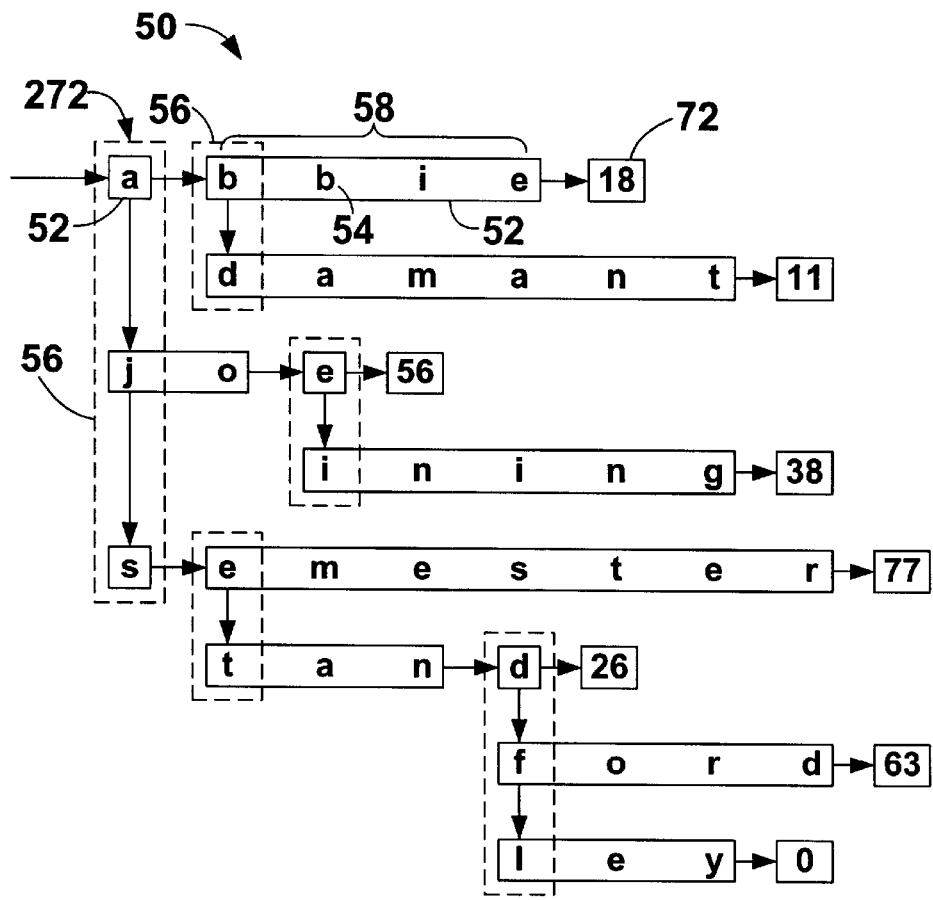
FIG. 5 is the tree of FIG. 2 restructured according to the horizontal embodiment of the present invention.

Note that when traversing forward through the tree of FIG. 2, some units 32 of a data item are no longer common to at least one data item, such as the vertical groups 'a'-'j'-'s' 38, 'b'-'d' 42, 'e'-'i', 'e'-'t', and 'd-'-'f'-'l'. Where this occurs, a list of alternatives for the next unit is established and a selection must be made from this list as to which path to take. Logically, all units can be considered as a member of an alternate list, some lists having only one member. In the horizontal embodiment, these single-unit alternate lists are compressed into segments 58 of more than one unit 54. Each segment 58 is contained in a node 52, resulting in a compressed tree 50, as in FIG. 5. Instead of 38 separate nodes 34, each containing one unit 32, there are only twelve nodes 52, shown in solid boxes, each containing a segment 58. Memory savings comes from not having to store overhead information for each of the units, but only for nodes. Multiple unit alternate lists 56 are shown in FIG. 5 by dashed boxes.

Figure 6:
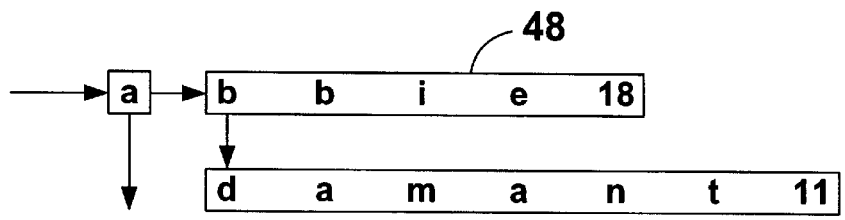
FIG. 6 is a portion of the tree of FIG. 5 with nodes incorporating an identifier.

Following the last node of a data item, the leaf node, is the data item identifier 72, a special type of node. It is also contemplated that the data item identifier be incorporated into the leaf node, if such an arrangement is feasible, as at 48 in FIG. 6. If there is more than one identifier associated with a data item, they are preferably stored as an alternate list.

In the horizontal embodiment, the nodes 52 and identifiers 72 are stored linearly and sequentially in memory first from left to right and then from top to bottom. Consequently, a data item is stored as a forward progression of nodes 52 in memory, that is, each segment of a data item will be later in memory than its previous segment. This statement comes with caveats pertaining to memory blocks, as described below. In the example of FIG. 5, the nodes and identifiers are stored in the following order: [a], [bbie], [18], [damant], [11], [jo], [e], [56], [ining], [38], [s], [emester], [77], [tan], [d], [26], [ford], [63], [ley], and [0].

Figure 7:
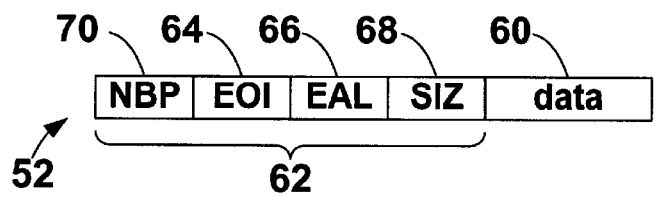
FIG. 7 is a diagram of a node header.
Figure 8:
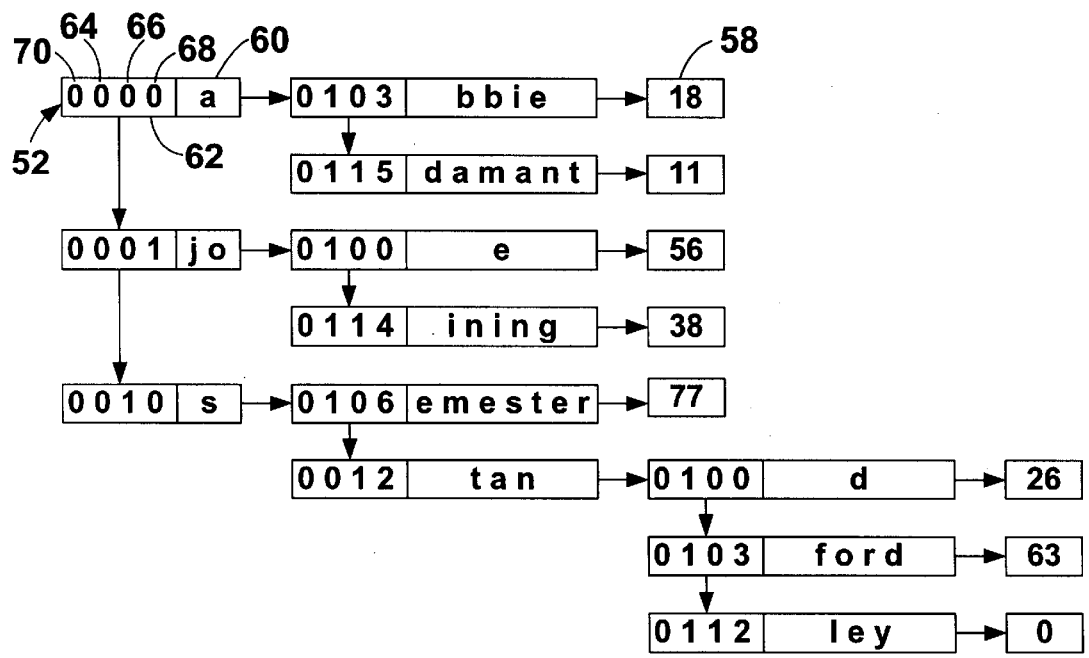
FIG. 8 is a logical SMTree of the present invention for the index of FIG. 1.
Figure 9:
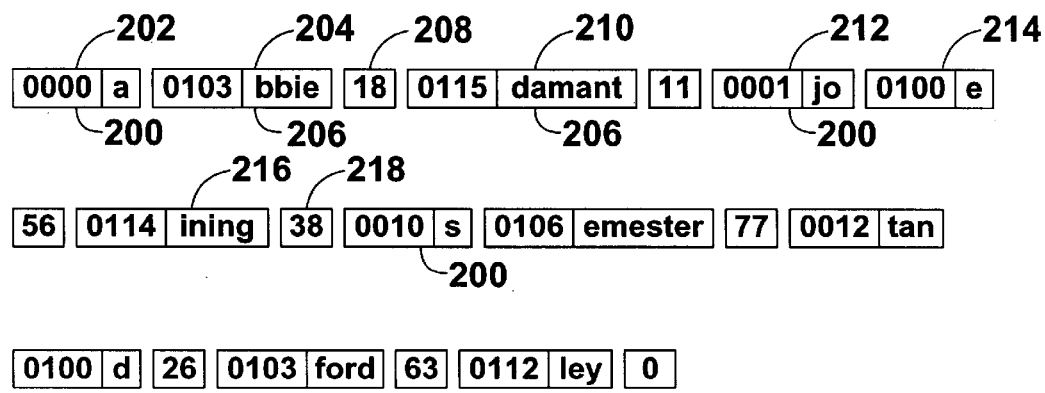
FIG. 9 is a diagram of how the SMTree of FIG. 8 is stored in memory.

In order to determine where in the SMTree the nodes 52 fit, each node 52, along with the data segment component 60, includes a header 62, which contains the parameters of the node 52. As shown in FIG. 7, the header 62 includes (1) a numeric field indicating the size of the node, (2) a binary (boolean) field, or flag, indicating whether or not the node is the end of a data item, (3) a flag indicating whether or not the node is the last node of an alternate list, and (4) a flag indicating the presence of a memory block pointer. FIG. 8 shows the tree 50 of FIG. 5 with the headers 62 for each node 52 and FIG. 9 shows how the nodes 52 are stored sequentially in memory. The first field 68 indicates the size of the node (SIZ field), that is, the number of units in the node. There are several ways to implement the size field 68. In order to maximize the size of a node, the preferred method is to assume that every node has at least one unit, and use the field to indicate the number of units more than the minimum size. For example, a node of five units will have a size field of 4, meaning that there are four more units in the node than the minimum of one. The second field 64 is the end of data item flag (EOI flag), where '1' indicates that the node is a terminal, or leaf, node, that is, at the end of the data item. The EOI flag 64 may also be used to indicate that additional information, such as the data item identifier 72, follows immediately after the node 52 or that the node 48 includes the data item identifier. The third field 66 is the terminal alternate flag (EAL flag), where '1' indicates that the node is the last node of an alternate list. The fourth field 70 is the next block pointer flag (NBP flag), which indicates whether a block pointer follows the node.

As indicated above, it is expected that the SMTree will reside in two types of storage, primary storage (RAM) and secondary storage (disk). Disks store information in fixed-length records, which are typically from 1024 to 4096 bytes long. The vast majority of SMTrees cannot fit into one record, so the present invention includes a mechanism for dividing the SMTree into subtrees to fit into multiple blocks. The present invention contemplates that the block size is not dependent upon the physical constraints of the disk drive. However, the block size is preferably chosen for efficiency, and will typically be the size of a disk record. The NBP flag 70 indicates whether or not a pointer to another block follows the node. In the preferred implementation, a single bit is used for the NBP flag 70, which means that all block pointers must be the same size. It is also contemplated that more bits can be used as the NBP flag 70 so that block pointers of different sizes can be used.

Figure 10:
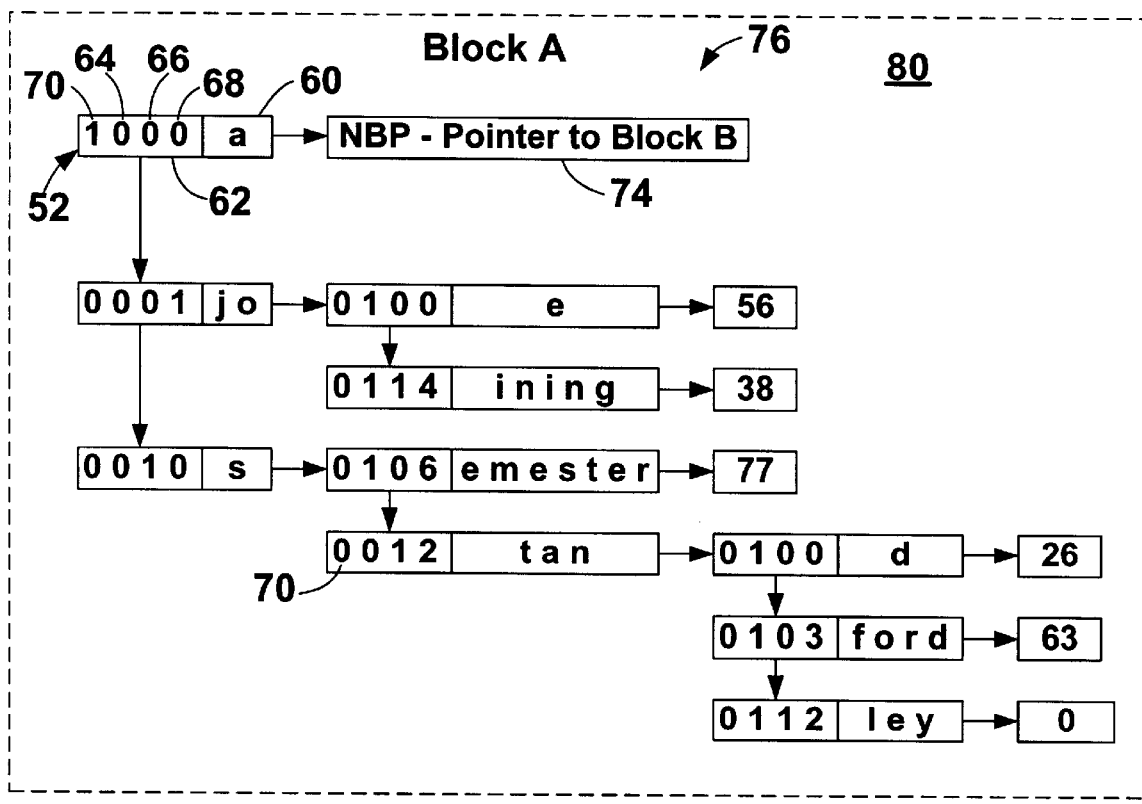
FIG. 10 is a diagram of how a single subtree in another block is referenced.
Figure 10:
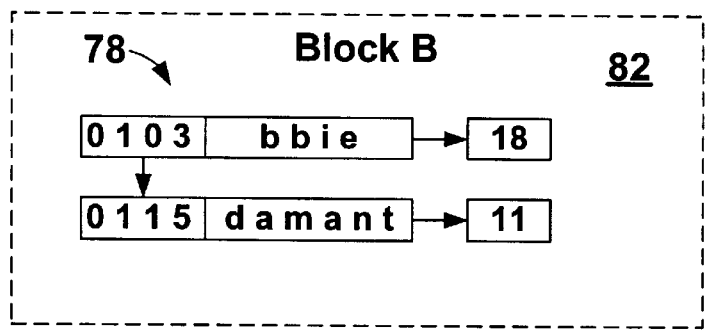

FIG. 10 shows the SMTree of FIG. 8 split between two blocks. The root alternate list 76 of the SMTree is in a root block 80 and a lower-level subtree 78 in an another block 82. A block pointer 74 following the "a" node points to the subtree block 82. Note that the subtree 78 always begins with an alternate list.

Implicit within the structure of the present invention is that a subtree cannot be larger than a block. However, a subtree can be smaller than a block so that it is possible to store more than one subtree in a block, increasing memory efficiency, as in FIG. 11. In order to maximize the number of blocks that can be used by the SMTree, the NBP field 74 points to a block, not to the subtree within the block. Consequently, a means is needed to find the appropriate subtree within the block. To facilitate such a means, each subtree includes a subtree header 84 that contains two fields, a previous unit field (PRU field) 86 and a subtree length field (STL field) 88, as shown in FIG. 12. The PRU field 86 contains a copy of the first unit of the node that preceded the jump to the subtree block, which is guaranteed to be unique for all subtrees in a block. A consequence of using the previous unit to find the appropriate subtree within a block is that all subtrees within a block must be pointed to by members of the same alternate list. Because the previous unit is used to differentiate subtrees within a block, the previous unit must be unique for all subtrees of the block. And the only way to guarantee that all previous units are unique is to require that they all be members of the same alternate list; all members of an alternate list are unique, there are no duplicates.

This requirement has a positive consequence: that any block will only be traversed once while searching for or retrieving a data item. Since an alternate list, by definition, contains only one data segment of a single data item, and all subtrees in a block are pointed to from the same alternate list, only one subtree in a block will be traversed during a single data item search. Thus, a memory block will only be traversed once during a data item search.

Generally, it is necessary to have the ability to traverse back through the SMTree. The present invention contemplates at least two methods for doing so. In the first, each block includes a header, shown in FIG. 13, with a previous block pointer field 106 (PBP field). In order to find the alternate list node that jumped to the lower-level subtree 96, the PBP field 106 contains a pointer to the block 90 that holds the higher-level subtree 94 containing the alternate list. The fact that the PBP field 106 only points to the higher-level block 90 implies the restriction that a jump to another block can only be performed from the root alternate list of a subtree. If a jump to another block occurred from any other alternate list, there would be no way of traversing forward through the higher-level subtree to find the alternate list that was the source of the jump to the lower-level block 92. The consequence of this restriction is that a single PBP field 106 is all that is needed to traverse backwards.

The second method contemplated for traversing backwards through the SMTree is to push each block that is traversed in the forward direction onto a block history stack. Alternatively, enough information is pushed on the stack so that the block and the subtree within the block can be located, including, for example, a pointer to the block within the entire SMTree and an index into the block for the subtree. In traversing backwards, each item popped from the stack is or indicates the next higher subtree in the data item hierarchy. This is the preferred method, and is the one that is implemented in the pseudocode.

Pseudocode defining the data structures for the operational pseudocode routines described later is listed in text file DataStructure.txt on the Computer Program Listing Appendix compact disk.

2. Traversing Forward in the Horizontal Embodiment

The SMTree of FIG. 9 is traversed using the information in the headers 62. For example, suppose one wishes to find the search word "joining" in the SMTree. The search begins at the first node of the root alternate list 200, the "a" node 202. Since the "a" node 202 does not start with the unit "j", the first unit of the search word, the search must find the next node of the root alternate list 200. It is known that there are additional nodes in the root alternate list 200 because the EAL flag 66 is '0'. Each successive node after the "a" node 202 must be read and discarded until the next node, in this case the "jo" node 212, of the root alternate list 200 is found. The "bbie" node 204 is read first. The location of the beginning of the "bbie" node 204 is calculated as a displacement from the "a" node 202 using the SIZ field 68 of the "a" node 202 and the fixed size of the header 62. It is known that the "bbie" node 204 is not the next root alternate list node because the EOI flag 64 of the "a" node 202 is not set, meaning that there is at least one horizontal node from the "a" node 202. It is also known that the "bbie" node 204 is the first node of a second level alternate list 206 because the structure of the SMTree requires that all nodes be members of an alternate list. It is further known that the "bbie" node 204 is not the end of its alternate list 206 because the EAL flag 66 is not set.

The size of index data bases leads inevitably to many levels of alternate lists. In the present example, the SMTree has three levels, but it can easily be seen that the number of levels is limited only by the length of the longest data item. Thus, some mechanism for keeping track of the alternate list level that is currently being traversed is needed. The structure of the SMTree lends itself to the use of a counter that is initialized to "1" at the beginning the current alternate list. The counter is incremented for any subsequent node that is not a leaf node, and is decremented for any node that is the end of an alternate list. When the counter equals zero, the node following the current node in the stream is the next alternate of the alternate list of which the counter is keeping track.

In the current example, reading the "a" node 202 causes the alternate list counter to be initialized to "1" to indicate that this is the alternate list that the first unit of the search word is in. Reading the "bbie" node 204 causes the counter to remain unchanged because it is a leaf node and is not at the end of an alternate list.

Since it is already known that that the "bbie" node 204 is not of interest to the search, the next node 210, "damant", is read. Its location is determined in essentially the same way as the "bbie" node 204. Its offset from the "bbie" node 204 is the sum of the SIZ field 68 of the "bbie" node 204, the "bbie" node header 62, and the length of the data item identifier 208 that follows the "bbie" node 204. It is known that the "damant" node 210 is the next node of the second level alternate list 206 because the EOI flag 64 of the "bbie" node 204 is set, meaning that there are no more horizontal nodes following the "bbie" node 204. The EAL flag 66 of the "damant" node 210 indicates that it is the last node of an alternate list 206, so the alternate list counter is decremented by "1" to "0".

Again, since the "damant" node 210 is not of interest to the search, the next node 212, "jo" is read. Because the alternate list counter is now "0", the "jo" node 212 is the next member of the root alternate list 200. A comparison is performed and it is found that the units of the "jo" node 212 are the same as the first two units of the search word "joining".

Since the EOI flag 64 of the "jo" node 212 is not set, the next node 214, "e", is read, starting a new alternate list level. A comparison shows that this is not the next unit of the search word, so it is discarded. Because of the "e" node 214 flag settings, it is known that the next node 216, "ining", is the next member of the alternate list. That node 216 is read, compared, and found to complete the search word. Finally, the data item identifier 218 following the "ining" node 216 is read and used as desired.

Figure 11:
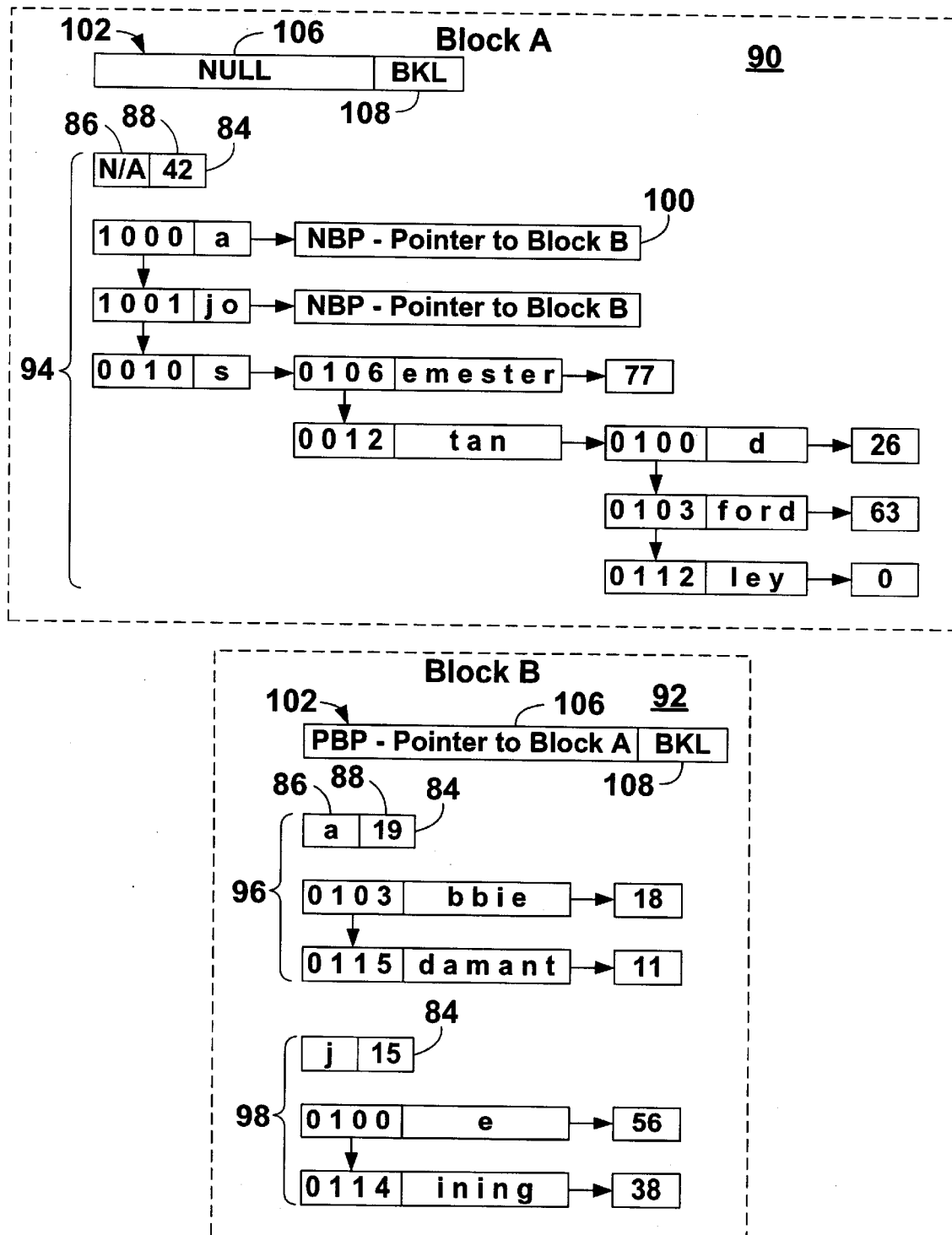
FIG. 11 is a diagram of how multiple subtrees in another block are referenced.

Note that FIG. 9 represents data in a single block. As indicated, an SMTree may exist over several blocks, as in FIGS. 10 and 11. FIG. 14 shows how the SMTree of FIG. 11 is stored in memory. In this case, a search for the data item "joining" would need to jump from Block A 90 to block B 92. Note that block B 92 has two subtrees 96, 98 and that the second subtree 98 includes the continuation of the data item "joining". The NBP field 232 following the "jo" node 230 will cause the jump to block B 92. Prior to the jump, information for the current block is pushed on the block history stack. After the jump, the PRU field 96 of the subtree headers are checked, in sequence, until the matching unit "j" is found. The first subtree header 234 has a PRU field 96 of "a", so it is discarded. The next subtree header 236, which is reached by using the STL field 88 of the previous subtree header 234, has a PRU field 96 of "j", meaning that it is the correct subtree. Then the subtree 98 is traversed as described above.

Example pseudocode for traversing forward to retrieve a data item from an SMTree is listed in text file Forward-Traverse.txt on the Computer Program Listing Appendix compact disk. The last several routines, FindDataItem, FindPartialDataItem, and RetrieveDataItem, are the routines that would be accessed by an external program to retrieve a data item from the SMTree.

3. Traversing Backward in the Horizontal Embodiment

Traversing backwards through the SMTree is typically used when an ordered list of data items in the SMTree is needed, such as a display of an alphabetical list of the data items. After the first data item is found, the SMTree is traversed backward to find the next higher alternate list from the leaf node of the first data item. Then the SMTree is traversed forward from the next unit of the alternate list to find the next data item. In this way, a sorted list of data items is generated without having to start from the root alternate list for each data item, saving a significant amount of processing time and disk accesses.

As indicated above, the preferred method for traversing backward is to store the forward traverse history of the current data item by node. Traversing backward through the SMTree is then a matter of reading the forward traverse history stored in the information kept for the current node. If the prior node is within the same block, the node is taken from the history information. If the prior node is in another block, the prior block information is popped from the block history stack described above. Then the root alternate list of the higher-level subtree 94 is traversed to find the node having the first unit that matches the PRU field 86 of the lower-level subtree 96.

Example pseudocode for traversing backward through the SMTree is listed in text file BackwardTraverse.txt on the Computer Program Listing Appendix compact disk. The last routine, RetrieveNextDataItem, is the routine that would be iteratively accessed by an external program to retrieve a sorted list of data items.

4. Adding Data Items to the Horizontal Embodiment

Generally during the life of an indexing data base, data items must be added, a process known as inversion. In the trees of the prior art, new data items must be added one at a time to the main tree, necessitating secondary storage accesses for each new data item. One object of the present invention is to minimize reads from and writes to secondary storage because of the times involved when compared to the actual processing of the SMTree. To this end, one optional aspect of the present invention is that the SMTree inversion process begins by combining all new data items into a temporary SMTree in primary storage until the temporary SMTree becomes too large or unwieldy for primary storage. Only at that time is the temporary SMTree merged with the main SMTree. Thus, in the SMTree of the present invention no secondary storage accesses are made until the temporary SMTree is merged with the main SMTree. Since dozens, and perhaps hundreds or thousands, of data items may be held in the temporary SMTree, it is obvious that the present invention provides a substantial savings in the time needed to add data items to the SMTree. And, unlike the data structures of the prior art, this savings does not come at the expense of the search. When making a data base structure choice between the typical prior art tree structures, a trade-off must be made between inversion time and search time. If a particular tree structure is used to minimize the inversion time, then the search time will be relatively larger. With the present invention, this tradeoff no longer need be made.

If a search needs to include the new data items, the search algorithm could either first merge the temporary SMTree with the main SMTree prior to the search, or the search could merely treat the search as two searches, one of the main SMTree and one of the temporary SMTree. This latter approach is likely to be the more efficient of the two. If the temporary SMTree is merged with the main SMTree prior to each search, there would be more accesses to secondary storage than for the search alone and some of the advantages of the present invention would not be realized to the fullest. If the temporary SMTree is maintained in primary storage for searches until it outgrows primary storage, no secondary storage accesses are needed prior to each search, reducing the search time.

Physically, the present invention stores a horizontal series of single-unit alternate lists in a single node. However, during the adding process, all units are treated logically as separate nodes. This greatly simplifies the process of adding a data item to an SMTree that has part of a node in common. For example, suppose the data item "justin" is to be added to the SMTree of FIG. 5. If a straight comparison of the unit 'j' to each node of the alternate list is made, 'j' does not exist because it is actually combined with the unit 'o' in the "jo" node. This means that in the adding process, the "jo" node has to be broken into a "j" node followed by an "o" node prior to adding the "ustin" node in the same alternate list as the "o" node. The implementation of the present invention logically treats all units as individual nodes so that comparisons are strictly unit-to-unit comparisons, rather than comparisons of combinations of units and multiple unit nodes.

The basic inversion mechanism traverses the SMTree searching for the data item that is being added, and when it reaches the point in the SMTree where a unit of the existing data item differs from the new data item, a new node containing the different unit and all subsequent units is added to the alternate list following the last common unit. The new node is inserted into the SMTree following the last node of the subtree of which the first existing different unit is the root node.

Figure 15:
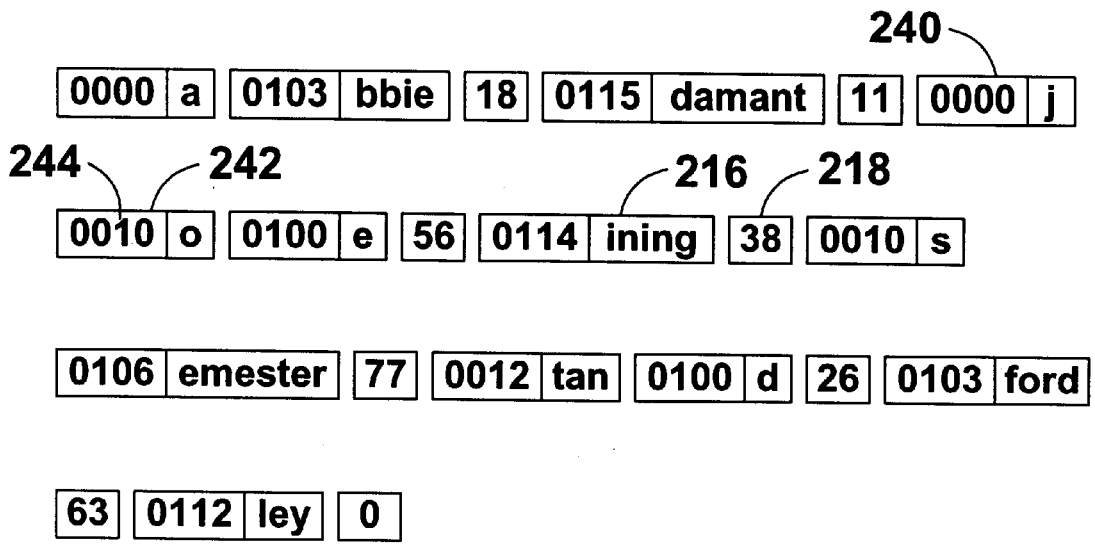
FIGS. 15 and 16 are diagrams showing how a data item is added to an SMTree.
Figure 16:
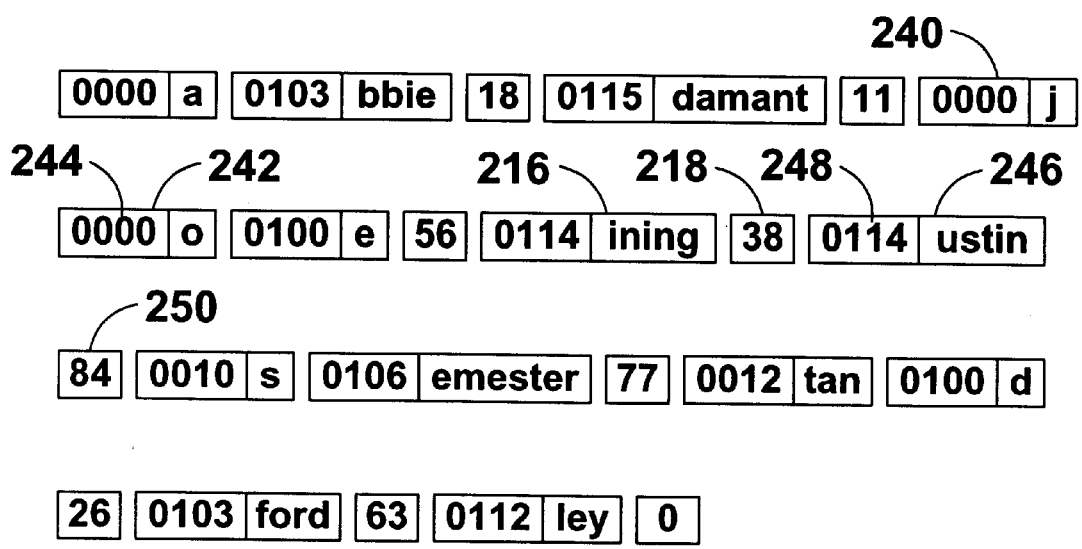

FIGS. 15 and 16 show the steps for adding the data item "justin" and identifier "84" to the SMTree of FIG. 9. The SMTree is traversed, looking for 'j' in the root alternate list, which is found in the node "jo" 212. Since the second unit of this node 212 is not 'u', the "jo" node 212 must be split into a "j" node 240 and an "o" node 242, as shown in FIG. 15. The new "j" node 240 keeps its position in the SMTree because it is still part of the root alternate list. The new "o" node 242 immediately follows the "j" node 240 because it is the first unit of the alternate list pointed to by the "j" node 240. Since it is the only member of its alternate list, the EAL flag 244 is set to "1". Next, a new "ustin" node 246 is created from the remainder of the new data item. The "ustin" node 246 is inserted into the SMTree following the last node of the subtree following the "o" node 242, which is the "ining" node 216 and its identifier 218, as in FIG. 16. Note that the "o" node EAL flag 244 has been reset to "0" because it is no longer the last node of the alternate list, and that the "ustin" EAL flag 248 has been set to "1" because it is now the last node of the alternate list. Then the "84" identifier 250 is inserted after the new "ustin" node 246.

The mechanics of inversion of the present invention are much more complex than this simple example, primarily because of the physical constraints under which the SMTree operates. In any practical implementation, size aspects of the SMTree have limitations. A node has a maximum size, limited by the amount of space allocated to the SIZ value 68. For example, if the node header 52 is allocated an eight-bit byte, the EOI flag 64, EAL flag 66, and NBP flag 70 each consume one bit, leaving five bits for the SIZ value, which means a maximum node size of 32 units. Secondly, the block size is typically the size of a disk record, 512, 1024, or 2048 bytes. The consequence of these size limitations is that any data item add function must include not only routines for manipulating nodes, but also routines for manipulating blocks and subtrees. Suppose, for example, that a block has two subtrees and that the addition of a data item increases one subtree so that it no longer fits in the current block. One of the subtrees must be moved to another block. Either enough space must be found in an existing block for the moving subtree or a new block must be created. The block header 102 includes a block length value (BKL) 108 that indicates the total length of all of the subtrees in the block, and can be used to determine how much space is available in the block for another subtree or to expand an already resident subtree. After determining where the subtree will be moved to, the subtree is moved, the NBP pointer of the higher-level subtree that points to the moving subtree is changed to the new block address, and the new block header is changed to account for the moving subtree. Finally, the new data item is added.

In a more complicated scenario, suppose that a block has only one subtree and that the addition of a data item increases the subtree so that it no longer fits in the block. First, a new subtree must be carved from the now-oversized subtree, including creating an NBP pointer in the remaining subtree, compressing the remaining subtree, and creating a subtree header for the new subtree. Second, either enough space must be found in an existing block for the new subtree or a new block must be created, and the newly-created NBP pointer must be filled in with the block address. Next, the new subtree must be moved to the new block, including modifying the block header to account for the new subtree. And finally, the new data item is added.

Example pseudocode for adding a data item to the SMTree is listed in text file AddDataItem.txt on the Computer Program Listing Appendix compact disk. The last routine, AddDataItem, is the routine that would be called by an external program to add the data item.

5. Merging SMTrees the Horizontal Embodiment

As discussed above, it is occasionally necessary to merge two SMTrees. FIG. 17 shows a temporary SMTree, consisting of the data items "carl", "carol", "juan", and "julia", that is to be merged in to the SMTree of FIG. 5. FIGS. 18 and 19 diagram the merging process. Essentially, the SMTree merging process is the process of merging the root alternate list 274 of the temporary SMTree 270 with the root alternate list 272 of the SMTree 50 that the temporary SMTree is to merged into, the main SMTree.

As with the process of adding a data item to an SMTree, all units are treated logically as separate nodes. This greatly simplifies the process of merging SMTrees and is assumed in the following description.

The main root alternate list 272 is traversed, looking for the first unit of the temporary root alternate list 274, the unit 'c'. Since 'c' is not found in the main root alternate list 272, the unit 'c' is added to the main alternate list 272, and all subsequent units are added to the main SMTree. This means that the nodes "car", "l", "ol", and their associated identifiers are inserted into the main SMTree, as at 276 in FIG. 18. Optionally, the added nodes will be removed from the temporary SMTree 270. One purpose of the removal is to ensure that there are no duplicate entries if, for example, a search interrupts the merging process. However, if the search is designed to terminate after finding the first occurrence of the data item, there is no need to remove the node from the temporary SMTree 270.

Next, the main root alternate list 272 is traversed, looking for the next unit (now the first unit after removal of the previous first unit 'c') of the temporary root alternate list 274, the unit 'j'. In general, each traverse looking for the next unit will start over at the beginning of the main root alternate list 272. However, since most SMTrees will be sorted in some kind of logical order, such as alphabetically, it will typically not be necessary to start over; the search for the next unit can begin where the previous search ended.

The unit 'j' is found in the node "jo" 212. Since the second unit of the "jo" node is not 'u', the "jo" node must be split into a "j" node and an "o" node, as described above with reference to adding a data item and as at 278 in Fig. Then the rest of the temporary SMTree 270 following the 'u' unit is added to the main SMTree 50. A new 'u' unit is inserted into the alternate list that starts with the new 'o' unit, and the nodes "an" and "lia" and their associated identifiers are inserted after the "u" node, as at 280.

As with the addition of a data item to an SMTree, the mechanics of merging two SMTrees is much more complex than this simple example. All of the same issues with the physical constraints imposed by the computer and storage arise with even greater force than when a single data item is being added.

Recall the explanation above regarding how adding data items to a temporary SMTree and then merging it with the main SMTree substantially reduces inversion time. The structure of the SMTree lends itself well to further reductions in inversion time through the use of parallel processing methods. As indicated, a merge of two SMTrees is accomplished by merging the two root alternate lists of the SMTrees. A single processor traverses through each root alternate list from the first list member to the terminal member. If a second processor is used, each root alternate list could be split at the same point, for example, in the middle of the list. The split does require that the two parts of the root alternate list have no secondary storage in common, otherwise it is possible that the two processors would be working in the same memory block at odds with each other. Since, from a logical viewpoint, none of the first part of the split alternate list is common to the second part of the same alternate list, each processor can work completely independently on its part of the alternate lists. Consequently, the inversion time can be reduced to as little as half the time as compared to a single processor. And, in general, as more processors are added, the inversion time can be reduced proportionately.

Example pseudocode for merging two SMTrees using one processor is listed in text file MergeTrees.txt on the Computer Program Listing Appendix compact disk. The last routine, MergeSMTrees, is the routine that would be called by an external program to merge two SMTrees.

6. Removing Data Items From the Horizontal Embodiment

Occasionally during the life of a data base, data items must be removed. The basic mechanism for removing a data item traverses the SMTree searching for the leaf node of the data item to be removed, and removes nodes in reverse order up to and including the node of a multiple-unit alternate list.

Like the add and merge operations, the mechanics of removing a data item are made more complex by the physical constraints under which the SMTree operates. Because there are multiple blocks and hierarchies of subtrees, a data item to be removed may cross a subtree/block boundary. If this should occur, the lower-level subtree and the block pointer to that subtree in the higher-level subtree are removed. And if the removed subtree is the only one in a block, the block is removed or freed.

Optionally, a method of compacting nodes can be implemented. If, for example, the last alternate list of the removed data item has only two members, once the data item is removed, that alternate list only has one member. It would then be possible to combine that remaining node with the node that precedes it. For example, if the data item "joe" was removed from the tree of FIG. 8, the "jo" node and the "ining" node could be combined into a single "joining" node.

Example pseudocode for removing a data item from the SMTree is listed in text file RemoveDataItem.txt on the Computer Program Listing Appendix compact disk. RemoveDataItem is the routine that would be called by an external program to remove the data item.

Vertical Embodiment

Figure 20:
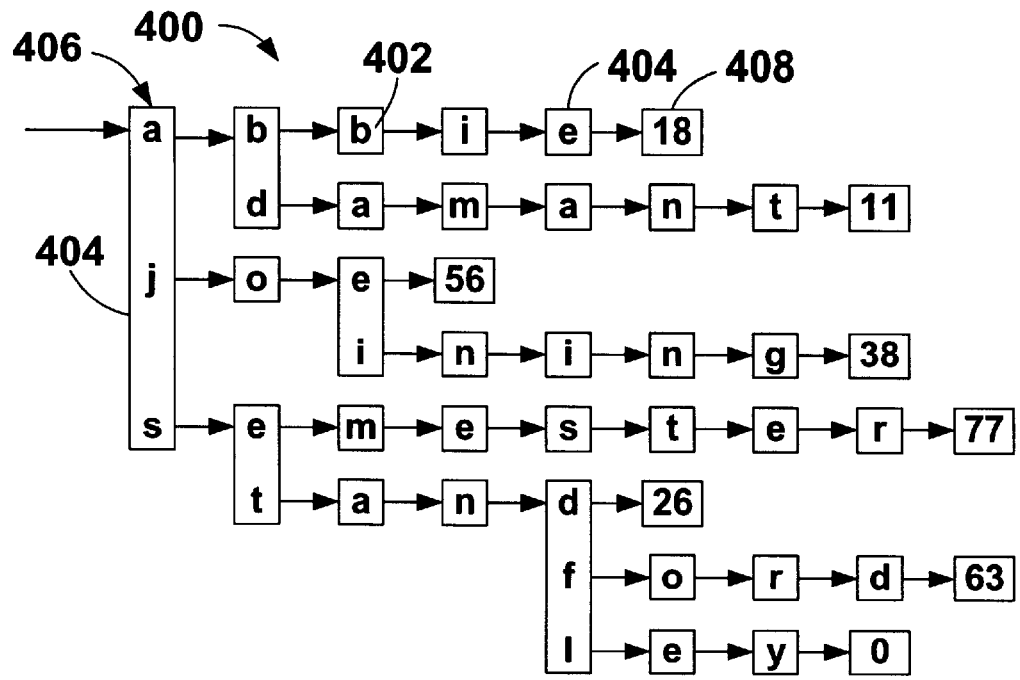
FIG. 20 is the tree of FIG. 2 restructured according to the vertical embodiment of the present invention.

In the vertical embodiment 400, units 402 are compressed vertically into nodes 404. In other words, each node 404 is an alternate list, as shown in FIG. 20 for the tree of FIG. 2. Instead of 38 separate nodes 34, each containing one unit 32, there are only 31 nodes 404, shown in solid boxes, each containing an alternate list 406. Note that there are many more nodes in the vertical embodiment, at least for this example, than there are for the horizontal embodiment (31 nodes versus 12 nodes).

In the vertical embodiment, the nodes 404 and identifiers 408 are stored sequentially in memory first from top to bottom then from left to right. That is, the nodes and identifiers are stored in the following order: [ajs], [bd], [o], [et], [b], [a], [ei], [m], [a], [i], [m], [56], [n], [e], [n], [e], [a], [i], [s], [dfl], [18], [n], [n], [t], [26], [o], [e], [t], [g], [e], [r], [y], [11], [38], [r], [d], [0], [77], [63].

Theoretically, an SMTree of the vertical embodiment is traversed in a manner similar to an SMTree of the horizontal embodiment. In practice, however, the implementation would be much more difficult. The amount of time it would take to find a particular data item is greater than with the horizontal embodiment. In the horizontal SMTree of FIG. 6, in order to find the data item "joining", six nodes and identifiers need to be read. On the other hand, in the vertical SMTree of FIG. 20, 29 nodes and identifiers must be read before finding the data item "joining", and another five nodes and identifiers must be read to reach the identifier for the data item "joining".

Because the horizontal embodiment is more efficient in most applications, it is preferred over the vertical embodiment. Consequently, the vertical embodiment has not been implemented. It is included here to show that the embodiment, although possible, is not a practical application of the present invention.

Hybrid Embodiment

Figure 21:
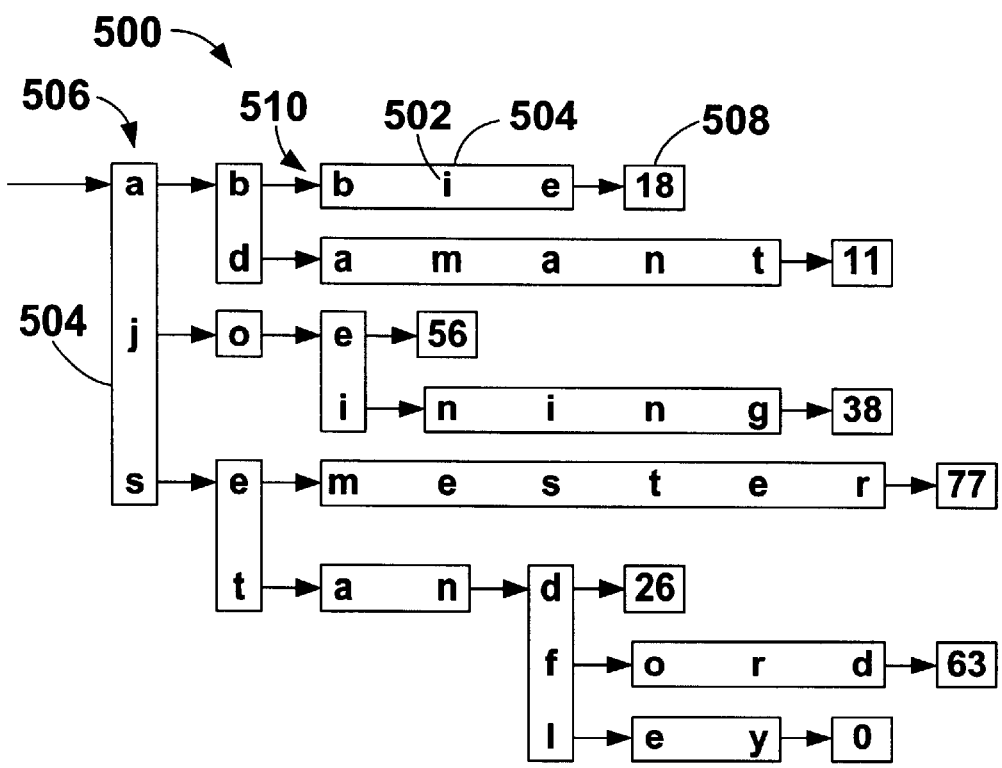
FIG. 21 is the tree of FIG. 2 restructured according to the hybrid embodiment of the present invention.

It is possible to combine characteristics of the horizontal embodiment with characteristics of the vertical embodiment to result in a hybrid embodiment 500. In the hybrid embodiment 500, an alternate list 506 is compressed into a node 504 and a horizontal series of unique units 502 are compressed into a node 504, as in FIG. 21. Instead of 38 separate nodes 34, each containing one unit 32, there are only 13 nodes 504, shown in solid boxes, each containing an alternate list 506 or a unique series 510.

There are two possible ways to store the hybrid embodiment 500 in memory, either horizontally or vertically. Horizontally, the nodes and identifiers are stored in the following order: [ajs], [bd], [bie], [18], [amant], [11], [o], [ei], [56], [ning], [38], [et], [mester], [77], [an], [dfl], [26], [ord], [63], [ey], [0]. Vertically, the nodes and identifiers are stored in the following order: [ajs], [bd], [o], [et], [bie], [amant], [ei], [mester], [an], [18], [11], [56], [ning], [77], [dfl], [38], [26], [ord], [ey], [63], [0].

The hybrid embodiment 500 has some of the same disadvantages as the vertical embodiment 400, but not as pronounced. For example, in order to find the data item "joining", ten nodes must be read. In addition, there are two types of nodes, rather than one, and the software needed to implement the hybrid embodiment would be correspondingly more complex.

Like the vertical embodiment, because the horizontal embodiment is more efficient in most applications, it is preferred over the hybrid embodiment. Consequently, the hybrid embodiment has not been implemented. It, too, is included here to show that the embodiment, although possible, is not a practical application of the present invention.

Thus it has been shown and described a data structure which satisfies the objects set forth above.

Since certain changes may be made in the present disclosure without departing from the scope of the present invention, it is intended that all matter described in the foregoing specification and shown in the accompanying drawings be interpreted as illustrative and not in a limiting sense.

What is claimed is:

1. A memory for storing data for access by an application program being executed on a digital computation system, said data being composed of at least one data item, said data item being composed of at least one data segment, said data segment being composed of at least one data unit including a first data unit, said memory including a data structure stored in said memory, said data structure including information resident in a database used by said application program, said data structure comprising:
    (a) a linear stream of nodes stored in consecutive memory locations in said memory, each of said nodes containing a data segment, said nodes including predecessor nodes and successor nodes and being related by location in said stream wherein each of said predecessor nodes is stored in a memory location before said node that it precedes within said stream and each of said successor nodes is stored in a memory location after said node that it succeeds within said stream;
    (b) progressions of said nodes in said stream from a root alternate list member node to a leaf node corresponding to progressions of data segments of said data items;
    (c) said progressions being traversed by advancing only once through said consecutive memory locations from said root alternate list member node using node information included in each of said nodes, said node information including a size value indicating the number of said data units in said node, a leaf node flag indicating if said node is a leaf node, and a terminal alternate flag indicating if said node is an alternate list terminal node;
    (d) each of said progressions being associated with at least one identifier that is adapted to reference at least one object external to said stream;
    (e) selected data segments of different data items in selected progressions of successor nodes being different for different data items; and
    (f) selected data segments of different data items in selected predecessor nodes being common to said different data items.

2. The memory of claim 1 wherein:
    (a) said computation system includes a plurality of memory blocks;
    (b) said stream is distributed among said memory blocks;
    (c) said node information includes a pointer flag indicating if said node includes a memory block pointer that points to a memory block; and
    (d) said node information includes a memory block pointer if said pointer flag is set.

3. The memory of claim 2 wherein:
    (a) each of said memory blocks contains one or more subtrees of said stream of nodes;
    (b) all of said subtrees of one memory block are pointed to from nodes of a single alternate list;
    (c) each of said subtrees of said one memory block is pointed to from a different node of said single alternate list; and
    (d) said each of said subtrees of said one memory block contains a copy of said first data unit from said different node;
    (e) whereby when said memory block pointer is followed from a node of an alternate list, a subtree continuing said progression of nodes is found by matching said first data unit with said copy of said first data unit.

4. The memory of claim 3 wherein:
    (a) each of said subtrees includes a subtree root alternate list;
    (b) said single alternate list is a subtree root alternate list; and
    (c) each of said subtrees includes a back pointer to said memory block containing said single alternate list;
    (d) whereby said progressions of nodes are traversed in reverse by following said back pointer and matching said copy of said first data unit with said first data unit of each of said nodes of said single alternate list to determine which one of said nodes of said single alternate list was traversed to reach said subtree containing said copy of said first data unit.

5. The memory of claim 3 wherein:
    (a) said computation system further includes a memory block stack;
    (b) said memory block stack being comprised of memory block information of said memory blocks traversed as said progressions of nodes are traversed that is pushed on said memory block stack;
    (c) each of said subtrees includes a subtree root alternate list; and
    (d) said single alternate list is a subtree root alternate list;
    (e) whereby said progressions of nodes can be traversed in reverse by popping said memory block information from said stack and matching said copy of said first data unit with said first data unit of each of said nodes of said single alternate list to determine which one of said nodes of said single alternate list was traversed to reach said subtree containing said copy of said first data unit.

6. The memory of claim 1 wherein each of said progressions of nodes is associated with one identifier, said identifier being included in said leaf node of said each of said progression of nodes.

7. The memory of claim 1 wherein said at least one identifier is stored in said stream immediately after said leaf node of each of said progressions of nodes.

8. A memory for storing data organized as a tree for access by an application program being executed on a digital computation system, said data being composed of at least one data item, said data item being composed of at least one data segment, said data segment being composed of at least one data unit including a first data unit, said memory including a data structure stored in said memory, said data structure including information resident in a database used by said application program, said data structure comprising:
    (a) at least one linear stream of nodes, each of said at least one stream stored in consecutive memory locations in said memory, each of said nodes containing a data segment, said nodes including predecessor nodes and successor nodes wherein each of said predecessor nodes is stored in a memory location before said node that it precedes within said stream and each of said successor nodes is stored in a memory location after said node that it succeeds within said stream;

(b) progressions of said nodes in said stream from a root alternate list member node to a leaf node corresponding to progressions of data segments of said data items;

(c) said progressions being traversed by advancing only once through said consecutive memory locations from said root alternate list member node by using node information included in each of said nodes, said node information including a size value indicating the number of said data units in said node, a leaf node flag indicating if said node is a leaf node, and a terminal alternate flag indicating if said node is an alternate list terminal node;

(d) each of said progressions being associated with at least one identifier that is adapted to reference at least one object external to said stream;

(e) selected data segments of different data items in selected progressions of successor nodes being different for different data items; and (f) selected data segments of different data items in selected predecessor nodes being common to said different data items.

9. The memory of claim 8 wherein:

(a) said tree is composed of a plurality of subtrees, each of said subtrees corresponding to one of said streams;

(b) said memory includes a plurality of memory blocks;

(c) each of said memory blocks includes at least one of said streams;

(d) said node information includes a pointer flag indicating if said node includes a memory block pointer that points to a memory block; and (e) said node including a memory block pointer if said pointer flag is set.

10. The memory of claim 9 wherein:

(a) all of said streams of one memory block are pointed to by nodes of a single alternate list;

(b) each of said streams of said one memory block is pointed to by a different node of said single alternate list; and (c) said each of said streams of said one memory block contains a copy of said first data unit from said different node;

(d) whereby when said memory block pointer is followed from a node of an alternate list, a stream continuing said progression of nodes is found by matching said first data unit with said copy of said first data unit.

11. The memory of claim 10 wherein:

(a) each of said streams includes a subtree root alternate list;

(b) said single alternate list is a subtree root alternate list; and (c) each of said streams includes a back pointer to said memory block containing said single alternate list;

(d) whereby said progressions of nodes are traversed in reverse by following said back pointer and matching said copy of said first data unit with said first data unit of each of said nodes of said single alternate list to determine which one of said nodes of said single alternate list was traversed to reach said stream containing said copy of said first data unit.

12. The memory of claim 10 wherein:

(a) said digital computation system further includes a memory block stack;

(b) said memory block stack being comprised of memory block information of said memory blocks traversed as said progressions of nodes are traversed that is pushed onto said memory block stack;

(c) each of said streams includes a subtree root alternate list; and (d) said single alternate list is a subtree root alternate list;

(e) whereby said progressions of nodes are traversed in reverse by popping said memory block information from said stack and matching said copy of said first data unit with said first data unit of each of said nodes of said single alternate list to determine which one of said nodes of said single alternate list was traversed to reach said stream containing said copy of said first data unit.

13. The memory of claim 8 wherein each of said progressions of nodes is associated with one identifier, said identifier being included in said leaf node of said each of said progression of nodes.

14. The memory of claim 8 wherein said at least one identifier is stored in said stream immediately after said leaf node of each of said progressions of nodes.

* * * * *